United States Patent [19]
Dahl

[11] 3,851,320
[45] Nov. 26, 1974

[54] EXTERNAL TEMPERATURE AND PULSE RATE SENSING AND TRANSMITTING DEVICE

[75] Inventor: Joseph D. Dahl, Minneapolis, Minn.

[73] Assignee: Bio Data, Inc., South Minneapolis, Minn.

[22] Filed: Nov. 8, 1973

[21] Appl. No.: 413,891

[52] U.S. Cl............... 340/189 M, 331/65, 331/66, 336/30, 340/195, 340/212
[51] Int. Cl....................... G08c 19/06, G08c 19/26
[58] Field of Search............... 340/189 M, 208, 195; 331/65, 66, 117; 336/134, 83, 30

[56] References Cited
UNITED STATES PATENTS
3,034,356   5/1962   Bieganski..................... 340/189 M
3,253,588   5/1966   Vuilleumier................... 340/189 M Primary Examiner—Thomas B. Habecker
Attorney, Agent, or Firm—Leo Gregory

[57] ABSTRACT

A temperature and pulse rate sensing and transmitting device mounted onto the chest wall of a patient encapsulating a circuit comprising a blocking oscillator adapted to determine a specific R.F. transmission of a carrier frequency and embodying a thermal element having a linear variation as a function of temperature change to shift the blocking rate of said frequency to provide temperature readings and embodying an element to vary the inductance of the coil of said circuit as a function of the pulse rate of the patient to shift the internal blocking frequency with respect to a calibrated frequency to provide pulse rate readings, both readings to be received by a receiver embodying standard techniques such as to provide a digital readout.

4 Claims, 5 Drawing Figures

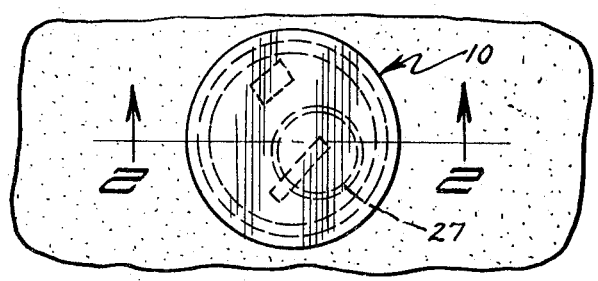
FIG. 1
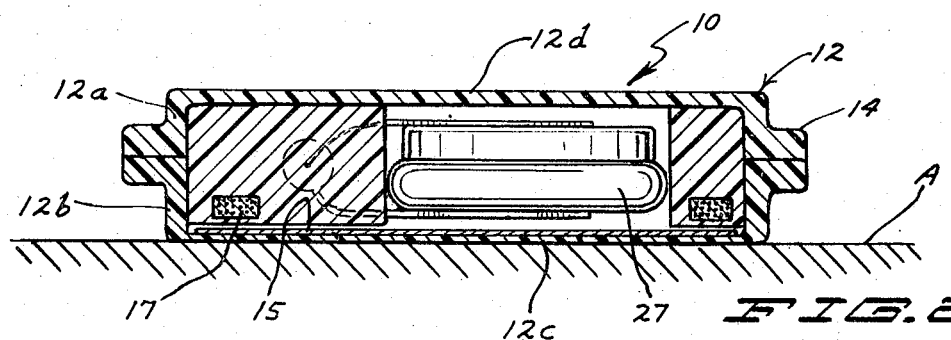
FIG. 2
FIG. 3
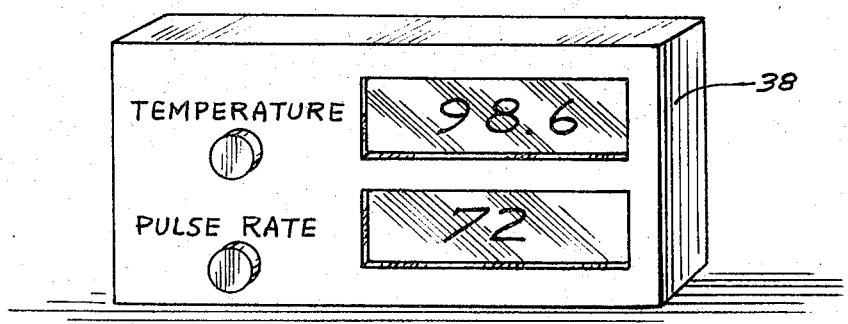
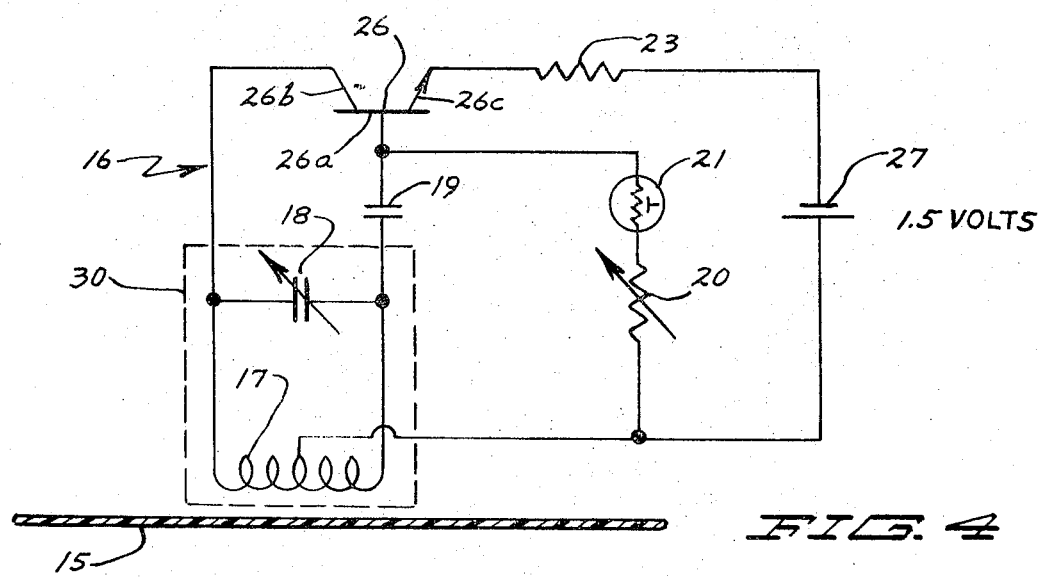
FIG. 4

EXTERNAL TEMPERATURE AND PULSE RATE SENSING AND TRANSMITTING DEVICE

SUMMARY AND BACKGROUND OF THE INVENTION

It is desirable to have means to secure a temperature reading and a pulse rate reading remote from a patient without disturbing the patient.

Such readings are generally taken periodically including the very early sleeping hours of the morning such as at 2:00 a.m. – 3:00 a.m. at which time the patient is awakened generally from a sound sleep. Conventionally a pulse rate reading is taken by contact with the wrist of the patient and preferably a rectal temperature reading is taken. This involves a complete arousal of the patient.

It is an object of this invention therefore to provide a small device adapted to be mounted onto the chest wall of a patient, said device transmitting signals sensed from the body of said patient which signals may be read remote from the body by conventional means as temperature and pulse rate readings.

It is another object of this invention to provide a transmitter of small size mounted onto the chest wall of a patient, said device including a signal transmitting circuit of a specific carrier frequency embodying means having a linear variation as a function of temperature change sensed from the body of a patient and having means therein varying as a function of pulse rate change sensed from the body of the patient whereby said means transmit signals read by conventional means to provide temperature and pulse rate readings.

It is more specifically an object of this invention to provide a device mounted onto the chest wall of a patient, and transmitting a signal of a specific frequency, said device comprising a circuit which includes elements which vary respectively as functions of body temperature change and pulse rate change, said device transmitting said changes as a shift in the blocking rate of its signal from a predetermined blocking rate giving a normal temperature reading to indicate temperature change and shifting the internal blocking frequency of its signal from a predetermined normal freuqency indicating pulse rate change, said changes in the blocking rate and internal blocking frequency respectively being received by appropriate conventional receiving means such as having a digital readout.

It is a more general object of this invention to provide a device to be attached to the chest wall of a patient, said device including a blocking oscillator circuit calibrated to provide a specific blocking rate and including a thermal resistance element having a linear variation as a function of body temperature change to vary the base bias of the blocking oscillator to shift the blocking rate and including an element in close proximity to the inductance coil of said circuit, which element through its movement responsive to the pulse or heart beat of the patient varies the inductance of said coil to shift the internal blocking frequency as a function of pulse rate change whereby said blocking rate and said internal blocking frequency and the respective changes therein are ready by conventional receivers embodying known techniques to provide temperature and pulse rate readings remote from the body of the patient.

These and other objects and advantages of the invention will be set forth in the following description made in connection with the accompanying drawings in which like reference characters refer to similar parts throughout the several views and in which:

FIG. 1 is a diagramatic broken view showing the invention herein in operating position;

FIG. 2 is a view in vertical cross section on an enlarged scale taken on line 2—2 of FIG. 1 as indicated;

FIG. 3 is a view in perspective of an appropriate reading device;

FIG. 4 is a schematic wiring diagram of the circuit carried by the device herein and a plate member in vertical section is shown in close proximity thereto.

DESCRIPTION OF A PREFERRED EMBODIMENT

Figure 5:
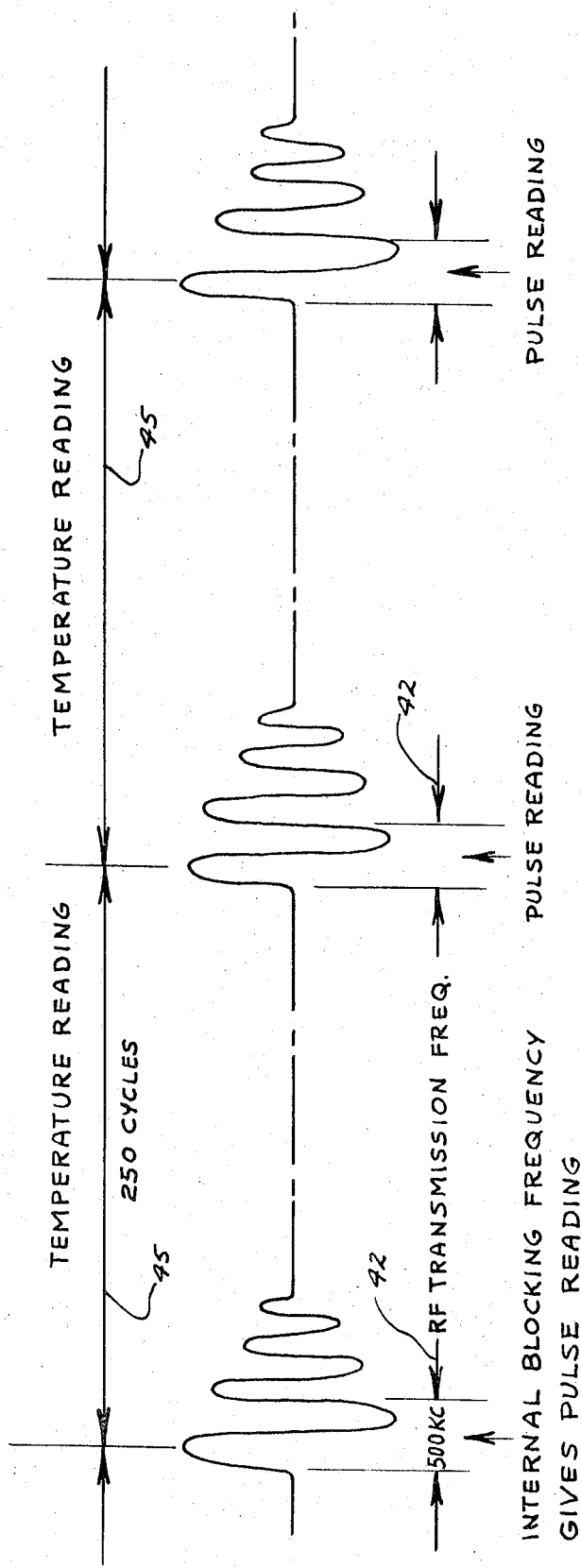
FIG. 5 is a diagramatic view of a signal transmitted by the device herein.

Referring to the drawings and more particularly to FIGS. 2 and 4, the device comprising the invention herein is indicated generally by the reference numeral 10. Said device embodying a modified blocking oscillator comprises a temperature and pulse rate sensing and transmitting device and as indicated in FIG. 5, provides an ascertainable output in the form of a sine wave 40.

As here shown, said device comprises a housing 12 which may take on various configurations and which in its present embodiment is shown as being cylindrical in form, of small thickness and having a flanged portion 14 thereabout. Said housing is conveniently molded of a suitable plastic material and is formed of two portions, 12a and 12b, for the convenience of encapsulating or inserting therein the transistorized circuit 16 to be described. Said portions are bonded together in a conventional manner such as by the application of heat or by the use of an adhesive.

Said portions 12a and 12 b respectively have side walls 12c and 12d. Disposed within said housing and secured to the inner side of said side wall 12c in close proximity to the coil 17 to be described is a thin flexible metal plate member 15. Said side wall 12c and said plate member will be sufficiently flexible to form a diaphragm as will be further described.

Said circuit 16 which comprises a modified blocking oscillator includes an inductance coil 17, a variable capacitor 18 and a blocking capacitor 19 connected to the collector 26b of a transistor 26 suitable for purposes herein.

Said coil 17 and capacitor 18 form a tank circuit 30 and are calibrated to provide a basic internal blocking frequency 42 which will indicate a normal pulse rate and in the embodiment said rate is indicated in FIG. 5 as being 500 KC which is intended to provide a reading of a normal pulse of 73 BPM (Beats Per Minute).

Said tank circuit is modified by the metal plate member 15 which within said housing will overlie directly the chest wall A of a patient and will vibrate in response to the pressure pulse of the heartbeat. The movement of said plate member is relative to any movement of the coil 17. The plate member in moving towards and away from said coil in functioning as a diaphragm causes by its movement a small shift in the basic internal blocking frequency and such shifts or changes in said frequency will be read to provide a reading of pulse rate changes.

Connected to said coil 17 and running to the base 26a of said transistor by-passing said blocking capacitor 19 is a variable resistor 20 which with said blocking capacitor are calibrated to establish a basic blocking rate 45 as indicated in FIG. 5 with said blocking rate being indicated herein as having a basic frequency of 250 cycles for the purpose of indicating a basis for a normal temperature reading of 98.6°F. In circuit with said resistor is a thermal element 21 which has a linear variation as a function of temperature change and more particularly herein of body temperature change to shift said basic blocking rate and such shift will indicate changes in body temperature readings.

The circuit 16 is here shown energized by a 1.5 volt miniature battery 27. Said battery is shown having one side thereof connected to said coil 17 and the other side thereof connected to the emitter 26c of said transistor. In circuit between said battery and said emitter 26c is a resistor 23 calibrated to control emitter degeneration to stabilize the output of said emitter against variation due to temperature change.

Said device 10 is arranged and constructed to transmit an R.F. signal for a distance on the order of 2 to 10 feet. Standard receiver techniques are well-known to receive the information or signals transmitted by said device 10 and to convert the signals received into information such as to provide a digital readout as indicated by the device 38 of FIG. 3, said device being shown only for the purpose of illustration and to indicate the convenience provided by the device herein.

OPERATION

The device is readily attached to the chest wall A of a patient by a piece of surgical tape with the wall 12c of said device being in contact with the patient's chest wall. As described above, said wall 12c and the underlying metal plate 15 form a diaphragm sufficiently sensitive to be responsive to and vibrate with the pressure pulse of the heartbeat.

The device operates continuously within the limited range indicated. As described, the signal transmitted by the basic blocking rate 45 and the signal transmitted by the basic transmission frequency or internal blocking frequency rate 42 will provide information to be picked up by an appropriate receiver which will convert the signals received into a reading which will give a normal numerical body temperature reading and a normal numerical pulse rate reading.

In various tests made, it has been noted that a body temperature change of 1/10°F. will cause a frequency shift in the blocking rate of approximately 30 cycles with the device being calibrated for a basic blocking rate of 250 cycles to give a normal body temperature reading of 98.6°F.

A change in the rate of movement of the plate member 15 responsive to changes in the rate of movement of the pressure pulse beat of the patient causes a variance in the inductance of the coil 17 which in turn causes a shift in the rate of transmission frequency. A change, for example, in the pulse rate of a patient from 72 BPM to 90 BPM will cause a change of 100 KC such as from the basic rate of 500 KC to 400 KC.

The body temperature and pulse rate changes will be received and converted into numerical readings by an appropriate receiver.

The changes in the blocking rate and the changes in the transmission frequency are independent of one another and do not affect each other. This results from the modifications herein of the basic blocking oscillator utilized.

It will be seen that the device as indicated provides great convenience in taking periodic readings of a patient with respect to body temperature and pulse rate without disturbing the patient and at considerable savings of time for medical and nursing personnel. The device as described is believed to be marketable at a cost not to exceed the average cost of a thermometer. The device is disposable at a low cost making possible a new steril device for use with each patient.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A temperature and pulse rate sensing and transmitting device having in combination
   a housing of small thickness for attachment at one side thereof to the chest wall of a patient,
   a transistorized R.F. transmission circuit encapsulated within said housing,
   said circuit comprising a blocking oscillator circuit including an inductance coil and a variable capacitor,
   said coil and said capacitor being calibrated to transmit a specific carrier frequency to indicate a normal pulse rate,
   a metal plate member carried at the inner side of said one side of said housing in close proximity to said coil and vibrating in response to the pressure of the heartbeat of said patient varying the inductance of said coil responsive to changes in the rate of said heartbeat shifting said carrier frequency accordingly,
   said circuit including a blocking capacitor and a variable resistor, said capacitor and resistor being calibrated to have said circuit transmit a specific blocking rate to indicate a normal body temperature,
   a thermal resistance element in circuit with said variable resistor and blocking capacitor shifting said blocking rate in accordance with and in response to changes in body temperature,
   whereby shifts in said carrier frequency and in said blocking rate of the signals transmitted by said circuit indicate changes of pulse rate and body temperature.

2. The structure set forth in claim 1, wherein
   said one side of said housing and same metal plate member form a diaphragm sufficiently sensitive to vibrate in response to the vibration of the heartbeat of the patient.

3. The structure set forth in claim 1, wherein
   said housing comprises a chamber,
   a battery in said chamber energizing said circuit,
   said coil being disposed about said battery within said chamber, and
   said metal plate member vibrates freely within said chamber in close proximity to said coil.

4. The structure set forth in claim 1, including
   a resistor in circuit with said thermal resistor and emitter of the transistor of said circuit to prevent emitter degeneration to stabilize the same against temperature change.

* * * * *